United States Patent [19]
Coonan et al.

[11] Patent Number: 5,687,297
[45] Date of Patent: Nov. 11, 1997

[54] MULTIFUNCTIONAL APPARATUS FOR APPEARANCE TUNING AND RESOLUTION RECONSTRUCTION OF DIGITAL IMAGES

[75] Inventors: Bonnie R. Coonan, Rochester; Anthony M. Frumusa; Aron Nacman, both of Penfield; Francis K. Tse; Michael L. Davidson, both of Rochester, all of N.Y.

[73] Assignee: Xerox Corporation, Stamford, Conn.

[21] Appl. No.: 496,654

[22] Filed: Jun. 29, 1995

[51] Int. Cl.⁶ .................................................. G06K 15/00
[52] U.S. Cl. .............................................. 395/102; 382/209
[58] Field of Search .................................. 395/102, 115, 395/116, 164, 165, 166, 523, 524, 507; 358/404, 444, 400, 402, 436, 261.4, 455, 456, 459, 460; 382/209, 217, 254, 232, 233, 235

[56] References Cited

U.S. PATENT DOCUMENTS

| | | | |
|---|---|---|---|
| 3,597,071 | 8/1971 | Jones | 355/3 |
| 4,544,264 | 10/1985 | Bassetti et al. | 355/14 R |
| 4,558,370 | 12/1985 | Mitchell et al. | 358/260 |
| 4,625,222 | 11/1986 | Bassetti et al. | 346/160 |
| 4,675,733 | 6/1987 | Tanimoto | 358/138 |
| 4,821,107 | 4/1989 | Naito et al. | 358/256 |
| 4,847,641 | 7/1989 | Tung | 346/154 |
| 4,847,677 | 7/1989 | Music et al. | 358/13 |
| 5,005,139 | 4/1991 | Tung | 364/519 |
| 5,021,892 | 6/1991 | Kita et al. | 358/468 |
| 5,029,108 | 7/1991 | Lung | 364/519 |
| 5,047,955 | 9/1991 | Shope et al. | 364/519 |
| 5,056,154 | 10/1991 | Aono et al. | 382/56 |
| 5,109,437 | 4/1992 | Honda | 382/56 |
| 5,170,340 | 12/1992 | Prokop et al. | 364/143 |
| 5,175,633 | 12/1992 | Saito et al. | 358/406 |
| 5,206,741 | 4/1993 | Shimura et al. | 358/404 |
| 5,223,948 | 6/1993 | Sakuri et al. | 358/404 |
| 5,237,316 | 8/1993 | Cox, Jr. et al. | 340/793 |
| 5,276,799 | 1/1994 | Rivshin | 395/162 |
| 5,301,262 | 4/1994 | Kashiwagi | 395/117 |
| 5,307,458 | 4/1994 | Freiburg et al. | 395/162 |
| 5,404,411 | 4/1995 | Banton et al. | 382/30 |
| 5,408,329 | 4/1995 | Mailloux et al. | 358/298 |

FOREIGN PATENT DOCUMENTS 1531401  11/1978  United Kingdom.

OTHER PUBLICATIONS

J. Randolph Sanders et al.; "Behind Hewlett–Packard's Patent on Resolution Enhancement Technology"; pp. 1–61 1990.

Stoffel and Moreland; "A Survey of Electronic Techniques for Pictorial Image Reproduction"; vol. COM-29, No. 12 Dec. 1981; pp. 1898–1925.

Edward R. Dougherty; "Mathematical Morphology in Image Processing"; 1992; pp. 43–90 Chapter 2.

*Primary Examiner*—Arthur G. Evans
*Attorney, Agent, or Firm*—Duane C. Basch

[57] ABSTRACT

The present invention is a method and apparatus for tuning the appearance and controlling dot growth of bitmap images rendered on a printing system. The invention operates to recognize those pixels with a bitmap image that are appropriate for alteration and, in response to downloadable output values, adjusts the identified pixels so as to ensure a desired output.

14 Claims, 11 Drawing Sheets

MULTIFUNCTIONAL APPARATUS FOR APPEARANCE TUNING AND RESOLUTION RECONSTRUCTION OF DIGITAL IMAGES

CROSS REFERENCE

The following related applications are hereby incorporated by reference for their teachings:

"METHOD AND APPARATUS FOR APPEARANCE TUNING OF BITMAP IMAGES," J. Parker, patent application Ser. No. 08/496,556, filed concurrently herewith.

"APPARATUS AND METHOD FOR ENCODING AND RECONSTRUCTING IMAGE DATA," Thomas I. Yeh et al., patent application Ser. No. 08/315,275, filed Sept. 29, 1994. (D/94329)

This invention relates generally to an apparatus capable of customizing the appearance of bitmap images rendered by a printing system, and more particularly to a dual-function circuit for detecting the presence of image regions requiring appearance tuning and/or regions requiring augmented compact dot growth, and generating appropriate output signals to accomplish such processing operations.

BACKGROUND AND SUMMARY OF THE INVENTION

The present invention is an apparatus suitable for implementing one or both of a pair of functions in a printing system; user-specified appearance tuning of a bitmap image output by a printing system, and augmented compact dot growth (ACGD), also referred to as pixel repositioning. Using the appearance tuning capability, it is possible to vary the density (lightness/darkness) of printed output on a particular image output terminal (IOT). Using the pixel repositioning, for example in association with a resolution reconstruction capability, image data discarded from an input image during an encoding process may be subsequently reconstructed in a manner which serves to replenish a substantial amount of the discarded image data and minimize degradation of an output representation of the image.

It is known that output of an image can be enhanced significantly through the use of a high addressability output device. For example, by using a printing machine with a capability of storing or buffering scanned data prepared at a resolution of 600×3 spots/inch (spi) a corresponding output of 1800×1 spi can be obtained. While such high resolution is desirable, storing image data at 600×3 spi is burdensome in a printing machine with the limited amount of memory found in many digital printing systems. While various printing systems advantageously exploit disk storage and associated compression schemes (e.g., Xerox DocuTech, and U.S. Pat. No. 5,047,955, to Shope et el. (Issued Sept. 10, 1991) disclosing a system in which input image data of a job is rasterized and compressed) it is, for purposes of outputting a job, necessary to store or buffer the job in system memory; particularly when the job must be precollated. Hence it is desirable to store or buffer a job in system memory of a high addressability printing machine at a first resolution and output it at a second resolution, where the first resolution is significantly less than the second resolution.

In one example, storing or buffering a job at less than 600×3 spi is accomplished by discarding image data. Naturally the discarding of image data may lead to a degradation of image quality when reproducing the image data. It is, therefore, also desirable to provide an apparatus that facilitates a technique or process in which at least a part of the discarded image data could be reconstructed, where image degradation is minimized using a pixel repositioning (AGDG) process. Particularly when the apparatus may also be used to tune the image. In a printing system, the resolution reconstruction capability serves to reduce the image data bandwidth necessary to produce high resolution output, whereas the appearance tuning and pixel repositioning capabilities necessarily add flexibility to the system to enable user-selectable density variation of the output print.

Using morphological-like, template-matching techniques the present invention facilitates the identification of specific pixel structures within a bitmap image. Once identified, the structures may be "repositioned" and "augmented," or "tuned" so as to appear in the fashion desired when rendered by an IOT.

Heretofore, a number of patents and publications have disclosed template-based filters for image enhancement and resolution conversion, the relevant portions of which may be briefly summarized as follows:

U.S. Pat. No. 4,544,264 and U.S. Pat. No. 4,625,222 to Bassetti et el., disclose enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,847,641 and U.S. Pat. No. 5,005,139 to Tung, teach print enhancement circuitry for a laser beam printer. The bit map of a region of the image to be output is compared to a number of patterns or templates. When a match is detected, a section of the bitmap that was matched is replaced with a unique bitmap section designed to compensate for errors. The replacement bitmap section may include predetermined shifting of some dot positions to compensate for the error in the original bitmap section.

U.S. Pat. No. 5,029,108 to Lung teaches an edge enhancement method and apparatus for dot matrix devices wherein a group of gradient mask matrices are applied to a matrix of pixels surrounding a "to be adjusted pixel" so as to determine the existence of an edge and the direction of the brightness change. Once determined, the factors are used to generate a code used to modify the to be adjusted pixel in order to enhance the smoothness of a segment transition.

U.S. Pat. No. 5,408,329 to Mailloux et el., discloses the use of digital darkness control or pixel stretch techniques in electronic imaging devices regardless of differences in development systems (e.g., write-white or write-black). The inventors note that it it is important to match images or have images look alike regardless of the particular system in a given machine that is used in developing the image. Accordingly, the invention provides an electronic adjustment to an original image in order to compensate for various development systems as well as to compensate for quality settings within a given development system. Employed are sets of decoding rules applicable to 2×2 or 3×3 arrays of image pixels to accomplish darkness adjustment for a given pixel matrix.

U.S. patent application Ser. No. 07/513,415, and the corresponding Japanese laid-open patent publication 4-227584 published Aug. 17, 1992, to Mailloux et al.

disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

A number of patents and publications are summarized in Torrey Pines Research, *Behind Hewlett-Packard's Patent on Resolution Enhancement™ Technology*, (Becky Colgan ed., BIS CAP International, 1990) pp. 1–60, including concepts associated with resolution enhancement.

James C. Stoffel et al. in *A Survey of Electronic Techniques for Pictorial Image Reproduction*, IEEE Transactions on Communications, Vol. COM-29, No. 12, December 1981 discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

*Mathematical Morphology in Image Processing*, pp. 43–90 (Edward R. Dougherty ed., Marcel Dekker 1992) describes efficient design strategies for the optimal binary digital morphological filter. A suboptimal design methodology is investigated for binary filters in order to facilitate a computationally manageable design process.

In accordance with the present invention, there is provided a printing system for processing a bitmap image consisting of a plurality of input image signals at a first resolution representing a bitmap image, comprising:

an encoder for encoding the input image signals at the first resolution so that the bitmap image is represented by a plurality of image signals at a second resolution lower than the first resolution, each of the second resolution signals having fewer bits than each of the first resolution signals so that a number of bits in the plurality of input image signals is discarded as a result of the encoding;

memory for storing the image signals at the second resolution;

a dual-function circuit for reconstructing the stored encoded bit stream so as to convert the second resolution image signals and for appearance tuning the second resolution image signals producing a pulse-width position-modulated output signal; and an output engine for outputting an image representation in response to the pulse-width position-modulated output signals generated by said programmable look-up table.

In accordance with another aspect of the present invention, there is provided an image processing apparatus for processing a bitmap image consisting of a plurality of input image signals representing a bitmap image, comprising:

context memory for storing a portion of the image signals;

a template matching circuit for comparing the stored image signals with a plurality of templates, said template matching circuit outputting signals indicating a match between the stored image signals and a template; and a programmable look-up table for generating a pixel output signal in response to the signals input thereto by the template matching circuit, the pixel output signal representing the characteristics of the pixel.

In accordance with yet another aspect of the present invention, there is provided a printing system for processing a bitmap image consisting of a plurality of gray input image signals at a first resolution representing a bitmap image at a resolution greater than the first resolution, comprising:

memory for storing the gray image signals at the first resolution;

pattern matching logic circuitry for identifying, within the gray image signals at the first resolution, target pixels requiring modification prior to output as binary pixels at a second resolution greater than the first resolution, said pattern matching logic circuitry producing a signal whenever a target pixel requiring modification is identified; and a programmable device, responsive to the signal generated by the pattern matching logic circuitry and the target pixel image signal, for producing an output signal for driving the printing system, said programmable device being programmed in accordance with a set of preselected appearance tuning and augmented compact dot growth requirements.

One aspect of the invention is based on the observation of problems with conventional printing systems. Such systems, although they may be capable of rendering images received in a page description language (PDL) such as Interpress (Xerox Corp.) or Postscript (Adobe Corp.), typically render the image in accordance with the appearance determined as a result of the particular marking engine employed. However, such systems may result in user dissatisfaction because of an expectation of the appearance, based in part upon the WYSIWYG document preparation software and/or prior prints produced on other printers (e.g., dedicated workstation or desktop printers).

This aspect is based on the discovery of a technique that alleviates these problems by allowing the user to specify a desired appearance or darkness level for the output print. This technique can be implemented, for example, by circuitry that is also employed to accomplish augmented compact dot growth (pixel repositioning) after resolution reconstruction of an encoded image. A machine implementing the invention can include a laser-based electronic printing system, wherein the laser beam intensity or exposure level may be modified via pulse width position modulation (PWPM) in response to the signals representing the tuned or reconstructed image.

BRIEF DESCRIPTION OF THE DRAWINGS

FIG. 8 is an illustration of a portion of an exemplary gray image;

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information (e.g., image data). When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." An n-bit item of data has one of $2^n$ values. A "multi-bit" item of data is an item of data that includes more than one bit.

The term "data" includes data existing in any physical form, and includes data that are transitory or are being stored or transmitted. For example, data could exist as electromagnetic or other transmitted signals or as signals stored in electronic, magnetic, or other form.

An item of data "defines" an image when the item of data includes sufficient information to produce the image. For example, a two-dimensional array can define all or any part of an image, with each item of data in the array providing a value indicating the color of a respective location of the image. A "raster" is a one-dimensional array of image data, reflecting a single line of data across a single dimension (length or width) of the image.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image. A "neighborhood operation" is an image processing operation that uses data relating to one part of an image to obtain data relating to another part of an image.

A segment of an image is adjacent to another segment of the image "along an edge" if the two adjacent segments meet at the edge and do not overlap. Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

The term "appearance tuning" (AT) refers to a lightening or darkening (density control) of a pixel by controlling the exposure period of the pixel in conjunction with a repositioning of the pixel relative to one or more neighboring pixels. The term "augmented compact dot growth" (ACDG) or "pixel repositioning" refers to the selective repositioning (e.g., left, center or right justified) of an exposure pulse within a pixel exposure period so that the pulse abuts a pulse from an adjacent pixel period so as to cause the resultant dot to become larger (grow) upon development. ACDG, when used alone (e.g., at nominal density) is simply the repositioning of a pixel. AT mode comprises pixel lightness/darkness as well as pixel repositioning (ACDG), and for this reason can provide for resolution reconstruction, rendering for example, an 1800 spi image.

The term "resolution reconstruction" represents a decoding operation performed on data defining an image, where an encoded signal representing a single partially exposed pixel and its neighbors is decoded to determine the placement of the partial-pixel exposure signal within a pixel boundary in order to accurately reproduce the image in an output print. Accurate reproduction, in this context, is understood to mean as similar as possible to the representation before the encoding.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

"Circuitry" or a "circuit" is any physical arrangement of matter that can respond to a first signal at one location or time by providing a second signal at another location or time. Circuitry specifically includes logic circuits existing as interconnected components, programmable logic arrays (PLAs) and application specific integrated circuits (ASICs). Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium devices with data storage media that they can access. A "memory cell" is memory circuitry that can store a single unit of data, such as a bit or other n-ary digit or an analog value.

"User input circuitry" or "user interface circuitry" is circuitry providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth.

An "image input terminal" (IIT) or "image input device" is a device that can receive an image and provide an item of data defining the image. A "scanner" is an image input device that receives an image by a scanning operation, such as by scanning a document.

An "image output terminal" (IOT) or "image output device" is a device that can receive an item of data defining an image and provide the image as output. A "display" is an image output device that provides the output image in human viewable form. The visible pattern presented by a display is a "displayed image" or simply "image." Printers or printing systems are other examples of image output terminals.

Figure 1:
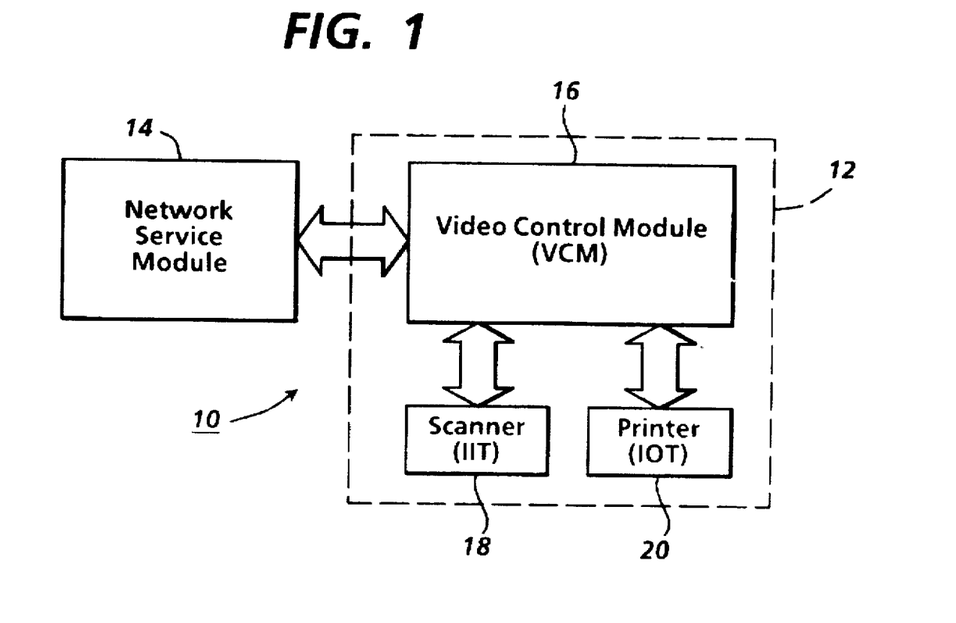
FIG. 1 is a block diagram depicting a multifunctional, network adaptive printing machine.

Referring now to FIG. 1, a multifunctional, network adaptive printing system is designated by reference numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example the VCM 16, which will be described in further detail below, coordinates the operation of the scanner (IIT) and printer (IOT) in a digital copying arrangement. In such an arrangement the scanner 18 "reads" or rasterizes an image on an original document using, for example, a charge coupled device (CCD) array, and converts analog video signals produced by the CCD into digital signals. In turn, an image processing system 22 (FIG. 2) associated with scanner 18 executes signal correction and the like, converts the corrected signals into multi-level signals (e.g. binary signals), compresses the multi-level signals and preferably stores the same in electronic precollation (EPC) memory 24.

Referring again to FIG. 1, the printer (IOT) 20 preferably includes a xerographic print engine. In one example, the print engine has a multi-pitch photoreceptor belt (not shown) exposed with an imaging source, such as a laser raster output scanning device or a light-emitting diode (LED) print bar. In a printing context, the multi-level image data is read out of the EPC memory 24 (FIG. 2) while the imaging source is turned on and off, in accordance with the image signals or data, forming a latent image on the photoreceptor. In turn, the latent image is developed with a development technique and transferred to a print media sheet. Upon fusing the resulting print it may be inverted for duplexing in the printing system or simply output therefrom. It will be appreciated by those skilled in the art that the printer can assume other forms besides a xerographic print engine (e.g., thermal ink jet or ionographic) without altering the concept upon which the disclosed embodiment is based.

Figure 2:
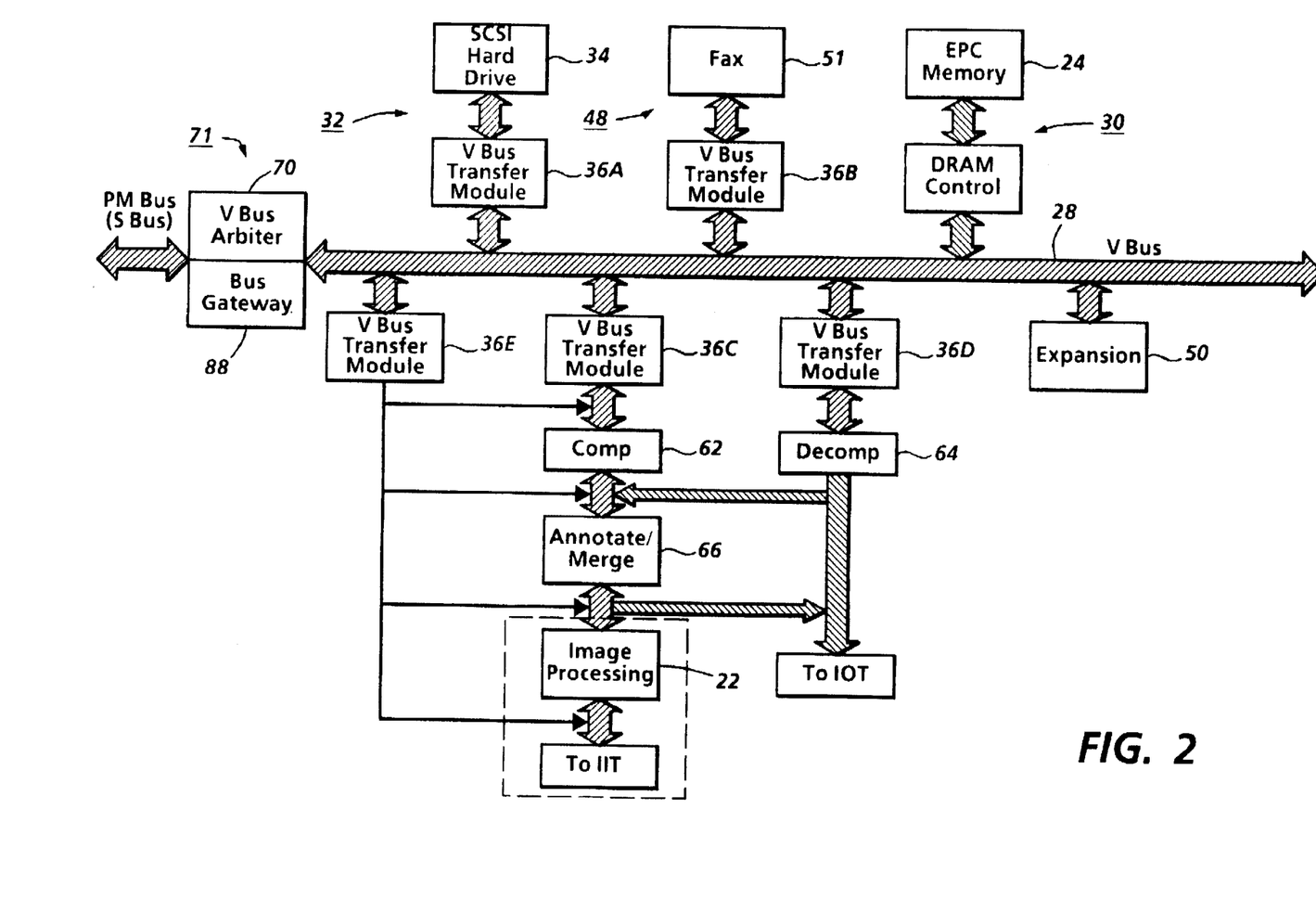
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, VBus 28 is a high speed, 32-bit data burst transfer bus, expandable to 64-bit. The 32-bit implementation has a sustainable maximum bandwidth of approximately 60 MBytes/sec., and a burst bandwidth as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32-bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way of transfer module 36a through the use of a suitable interface.

Figure 3:
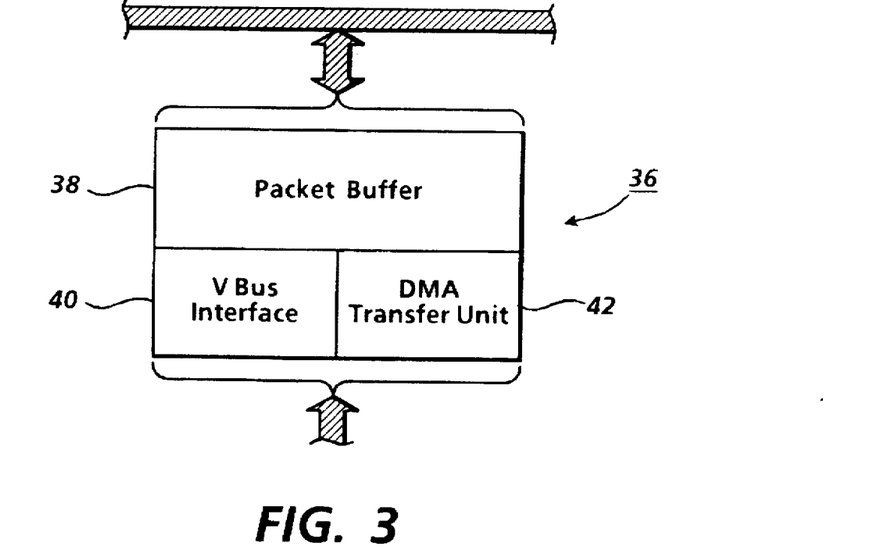
FIG. 3 is a block diagram of a transfer module used in conjunction with the printing machine of FIG. 2.

In FIG. 3, the structure of one of the transfer modules 36 is depicted in further detail. The illustrated transfer module of FIG. 3 includes a packet buffer 38, a VBus interface 40 and DMA transfer unit 42. The transfer module 36 is a programmable arrangement permitting packets of image signal data to be transmitted along the VBus. In particular, the packet buffer is programmable so that the segment or packet size can be varied according to the available bandwidth of the VBus. In one example, the packet buffer can programmed to handle packets of up to 64 Bytes. Adjustment of the packet size is achieved with VBus interface 40 and a system controller (not shown). Essentially, the VBus interface is an arrangement of logical components, including, among others, address counters, decoders and state machines, which provide the transfer module with a selected degree of intelligence. Interface 40 communicates with the system controller to keep track of desired packet size and, in turn, this knowledge is used to adjust the packet size of the packet buffer 38, in accordance with bus conditions. That is, controller 28 passes directives to interface 40 so that the interface can adjust packet size in view of its knowledge regarding conditions on the VBus.

Referring to FIGS. 1 and 2, three I/O components are shown as being coupled operatively to VBus 28, namely a FAX module 48, the scanner or IIT 18, and the printer or IOT 20. It should be recognized, however, that a wide variety of components could be coupled to the VBus by way of an expansion slot 50.

Referring again to FIG. 2, the IIT 18 and IOT 20 are operatively coupled to the VBus 28 by transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system.

The scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by a system controller. Preferably, the functions are arranged along a "pipeline" in which image data is input to one "end" of the pipe, and processed image data is output from the other "end."

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time.

As illustrated by the embodiment of FIG. 2, input image data from an IIT may be input to image processing section 22. In one mode of operation, the input image data is obtained by scanning or rasterizing a document to produce $2^x$ bits of gray data in the form of a bit stream for each pixel position. In turn, the gray data is thresholded so that an image pixel is expressed as an n-bit image signal where n is less than $2^x$. In one example, the given input image (gray data) is processed at 600×3 spi so that n=3 and a resulting output, with a resolution of 1800 ×1 spi (high addressability), can be obtained. It has been found, however, that storage can be optimized and a high addressability output resolution of 1800×1 spi obtained even when the value of n is less than 3. As will appear, the present technique is applicable for inputs and outputs of various resolutions, and image data can be obtained from a wide range of input sources without affecting the concept underlying the disclosed embodiment.

In accordance with the technique described in U.S. patent application Ser. No. 08/315,275, previously incorporated by reference, image data is encoded so that n bits are described with n−m bits where each m-bit signal represents positional information (e.g., subpixel position within a pixel period) while the n-bit signals represent intensity information (gray level). In other words, three bits of "gray" image data (e.g., 600×3) are encoded or characterized for output with two bits (e.g., one of four levels; 600×2). It follows that each 600×2 pixel then can be decoded so as to simulate 1800×1 data. Normally, three bits would be required to describe each of three subpixels at 1800×1 spi, but in the preferred encoding technique only two bits, designated by the term "intensity," are required to describe a group of three 1800×1 spi pixels, or more appropriately subpixels. The advantage of such a system is a reduction in the hardware and/or bandwidth in the VCM necessary to accomplish processing of the 2bit/pixel image data over 3-bit/pixel data.

It is to be understood that high addressability output devices, IOTs, may be employed to produce "gray" output using subpixel addressing. More specifically, a 2-bit/pixel output image may be produced using a pixel addressing scheme where each pixel is output as a series of two subpixels, where the order and on/off state of the subpixels results in a "gray" output when considered on a pixel-by-pixel basis. However, the higher addressability feature typically results in more image data in order to render "gray" output. The present invention is directed, in part, to the processing of encoded gray data (e.g., 600×2) so that the amount of data necessary to accomplish the rendition of gray input data is reduced.

As examples, a 600×2 spi pixel, with an intensity of 00/b, is equivalent to three white pixels at 1800×1 output, a 600×2 spi pixel, with an intensity of 01/b, is equivalent to one black pixel and two white pixels, at 1800×1 spi, and so on. Nonetheless certain image-related information is lost by such an encoding scheme because gray pixels represented by the 3-bit image signals (600×3) cannot be fully described by just two bits. In other words, use of only two bits does not indicate whether the black pixel was left justified, right justified or center justified. However, this missing or lost information can be provided via a reconstruction step or process.

Referring again to FIG. 2 an encoded bit stream is compressed, with compressor 62 and stored in EPC memory 24. The compressed data is then held in EPC memory until it is copied to disk 34 or output to an appropriate output device, such as the printer (IOT) 20. When it is time to output the stored data decompression is effected with decompressor 64. As will be appreciated from the discussion above, movement of data between the image processing section, compressor, EPC memory and the decompressor, is facilitated with the transfer modules 36.

Figure 4:
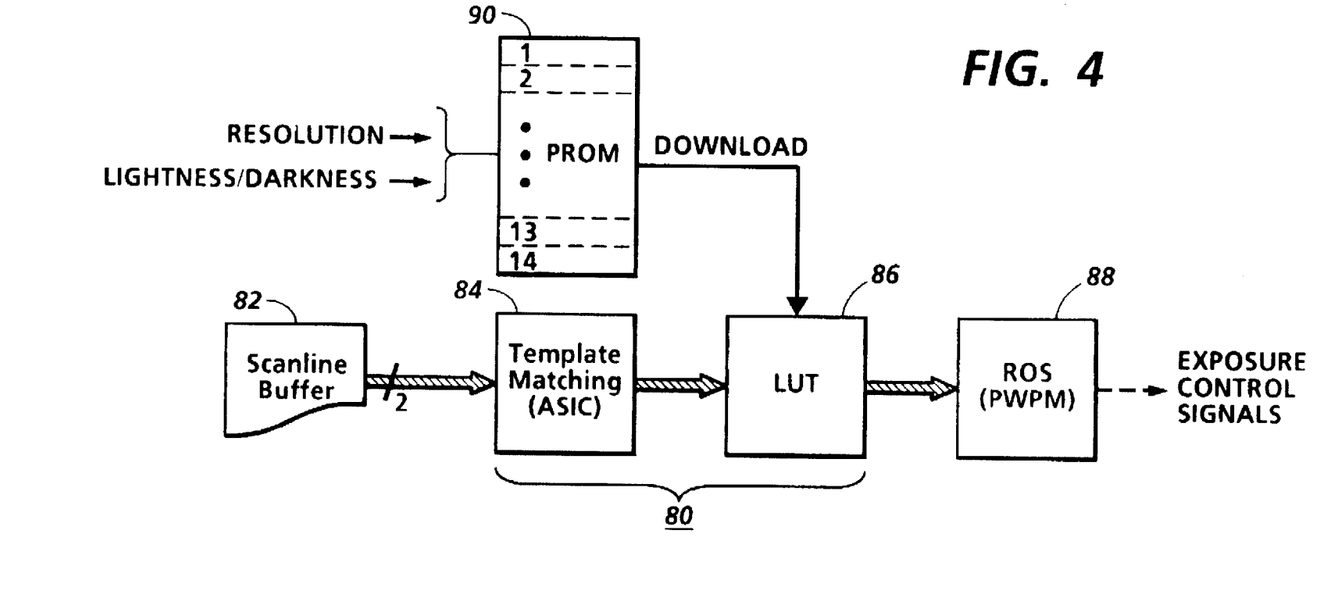
FIG. 4 is a schematic block diagram of a programmable dual-function circuit employed in the present invention.

In anticipation of outputting the image data, the corresponding bit stream is analyzed with a dual-function circuit 80 as represented in a simplified manner by the schematic drawing of FIG. 4. Circuit 80 is preferably implemented as an ASIC which may include additional logic functionality thereon. Alternatively, the image processing operations described herein may be performed on a programmable computer, data processor or image processing system. In the preferred embodiment, the dual-function circuit 80 is located within an ASIC in the VCM 16 of FIG. 1, but may also be placed in-line at any location between decompression block 64 of FIG. 2 and the IOT. The dual-function circuit 80 comprises a pair of functional blocks; template matching circuit or block 84 and look-up table (LUT) 86. Functionally, circuit 80 receives rasterized image signals in a 600×2 format from an image buffer 82, which may be any of the previously described memory devices, and processes the image signals so as to produce signals suitable for driving a pulse-width, position-modulated raster output scanner (ROS) 88. The operation of the dual-function circuit 80, as depicted by blocks 84 and 86 include resolution reconstruction with augmented compact dot growth and appearance tuning.

Figure 5:
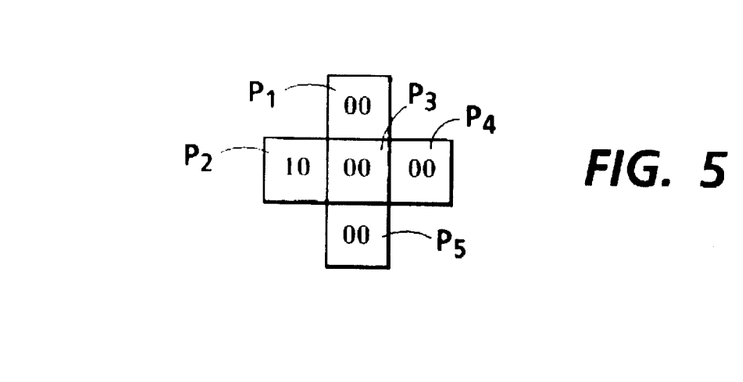
FIG. 5 is an illustration of a plurality of image data in a two-dimensional array representing a context window in accordance with the present invention.

Referring to FIG. 5 in conjunction with FIG. 4, in either the appearance tuning (AT) mode or the augmented compact dot growth (ACDG) mode, the purpose of the template matching block 84 is to detect an edge or brightness transition between a target pixel ($P_3$) and any of its adjacent neighboring pixels ($P_1$, $P_2$, $P_4$ or $P_5$). In particular, the exposure position of the target pixel may be adjusted relative to the neighboring pixels in order to accomplish a density adjustment (appearance tuning) or to more accurately reconstruct the image by repositioning the pixel exposure pulse. For example, a gray center pixel (01/b or 10/b) located between a black and a white pixel will likely have its exposure position shifted toward the black pixel in order to avoid a single black pixel being spaced apart from a larger black region. In other words, the compact dot growth operations seek to place the subpixel exposure pulse in the position most accurately reflecting its position within the gray scale (600×3) input image, whereas the appearance tuning operation selectively adjusts the width and position of the exposure pulse in order to modify the density (lightness/darkness) of the resulting printed output. This dual-functionality of the system may be mutually exclusive; meaning that circuit 80 can be "programmed" to operate in a first mode to adjust output image density by repositioning pixels and modifying exposure pulse periods at times when it is not operating in a second mode where only pixel position is adjusted. Alternatively, the mode or modes in which the system operates at any point in time may be selectable in response to user and/or system inputs.

Determination of the mode in which the dual-function circuit is operating is controlled by a system controller (not shown) in the IOT via the data downloaded into LUT 86 of FIG. 4. Generally, the system will operate at a nominal density setting and circuit 80 will operate to perform ACDG operations. However, when a user specifies an alternate density level, different data will be downloaded into LUT 86 so that appearance tuning of the input image signals may be accomplished. Depending on the data downloaded, the ACDG (pixel repositioning) operations may be accomplished independent of or in association with the appearance tuning operations. Although the data (LUT values) that are to be downloaded are preferably predefined for particular resolutions and desired processing modes, such data is merely stored in memory (PROM) and it would also be possible to implement the present invention by employing additional processing operations to determine the data to be downloaded in a real-time fashion prior to or during the output of a print. Having briefly described the functional aspects of dual-function circuit 80, details of the template matching block 84 and the LUT 86 will now be described.

As previously noted, the data values for LUT 86 may be downloaded. In one embodiment, such values may be selectively downloaded in response to a user specification for the density of the output to be produced. In an alternative embodiment, the values may be supplied to the printing system by a transmission that is either part of, or in addition to, the transmission of the bitmap image data to be printed. Although not specifically illustrated, it is well-known that the printer user interface and/or a computer workstation window may be employed to allow a user to select the desired characteristics for the output. As illustrated in FIG. 4, once selected in response to the resolution and lightness/darkness settings specified, an appropriate one of fourteen sets of LUT values would be retrieved from a memory device 90 and transmitted so as to be downloaded into LUT 86. In a preferred embodiment, memory device 90 would be a programmable read-only memory (PROM) and LUT 86 would be random access memory, preferably static RAM (SRAM). Hence, the downloaded values would be used to tune the appearance and/or adjust dot growth of the output image until a subsequent operation changed the values loaded therein.

Figure 6:
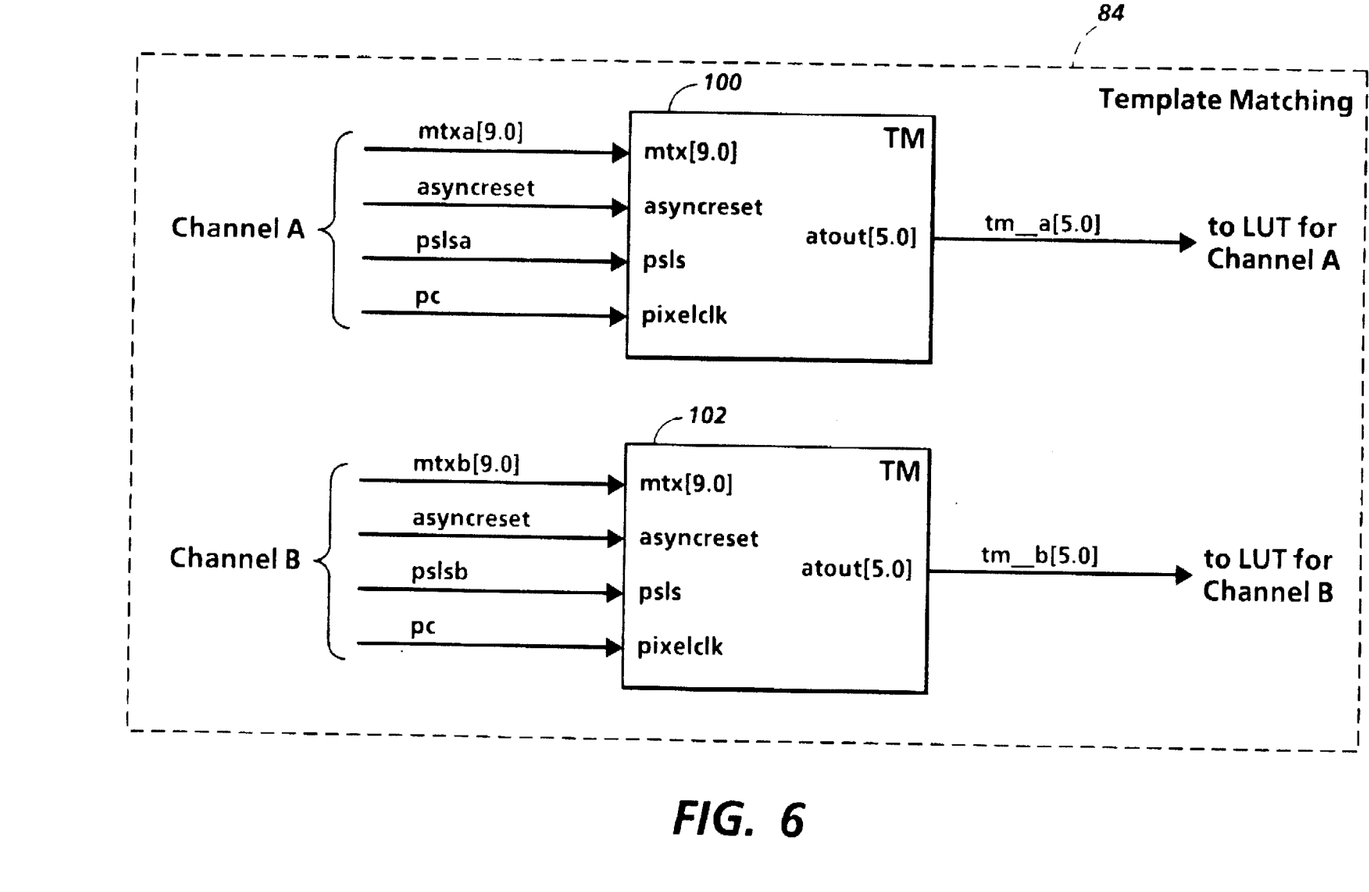
FIG. 6 is a block diagram of the template matching circuit aspect of the application specific integrated circuit (ASIC) of FIG. 4.
Figure 10:
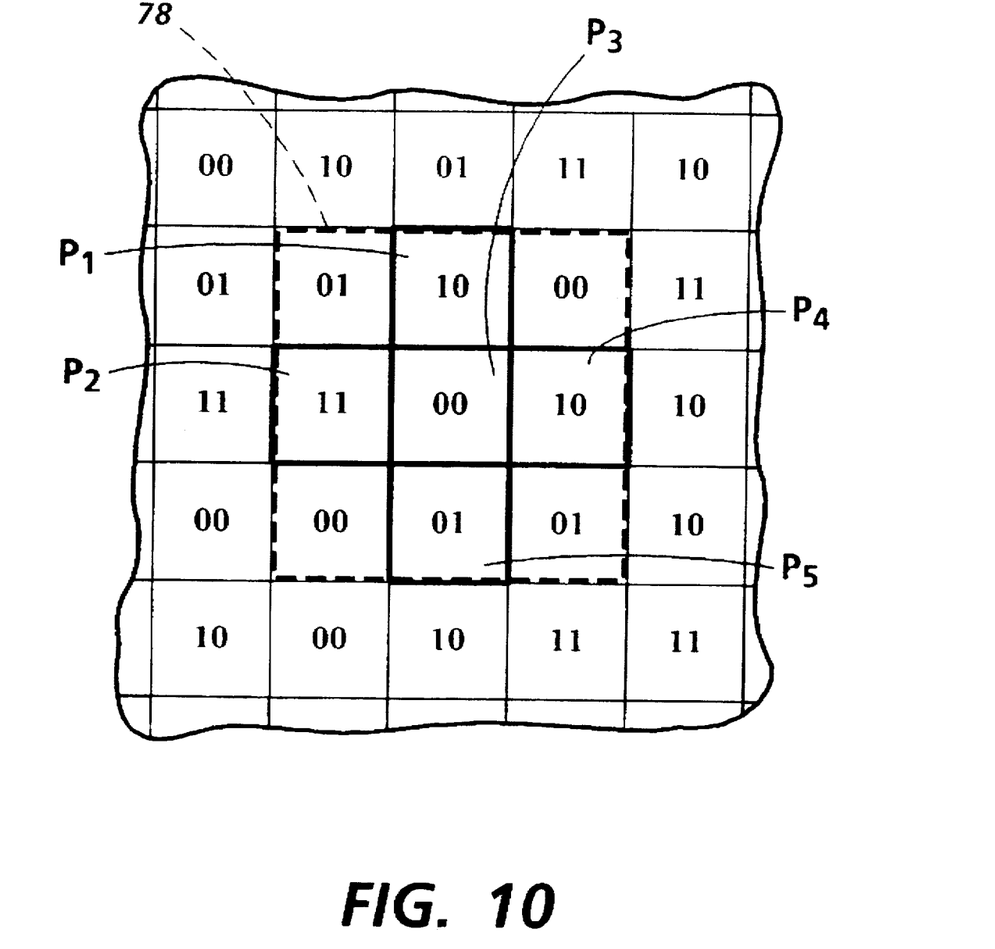

Referring to FIGS. 4 and 6 the template matching operations of block 84 are preferably accomplished by a dual-channel processing architecture, where the two channels (A and B) are identical. The input to the template matching block is a stream of 2-bit image signals (mtx[9:0]) representing a target pixel and a plurality of neighboring pixels (see context window 78 in FIG. 10). The center pixel is the pixel upon which the template matching operations are performed in accordance with the exemplary partial set of templates represented by FIGS. 11–13. Referring to FIG. 10, which depicts an image segment, the center and adjacent pixels ($P_1$–$P_5$) are compared to a plurality of templates 200, 202, 204 and 206 (FIGS. 11–13) to detect a match therewith. Once a match is detected, the corresponding code for the template is output from the template matching block 84 to LUT 86 where a preloaded PWPM output signal is generated and passed on as will be described below.

Figure 7:
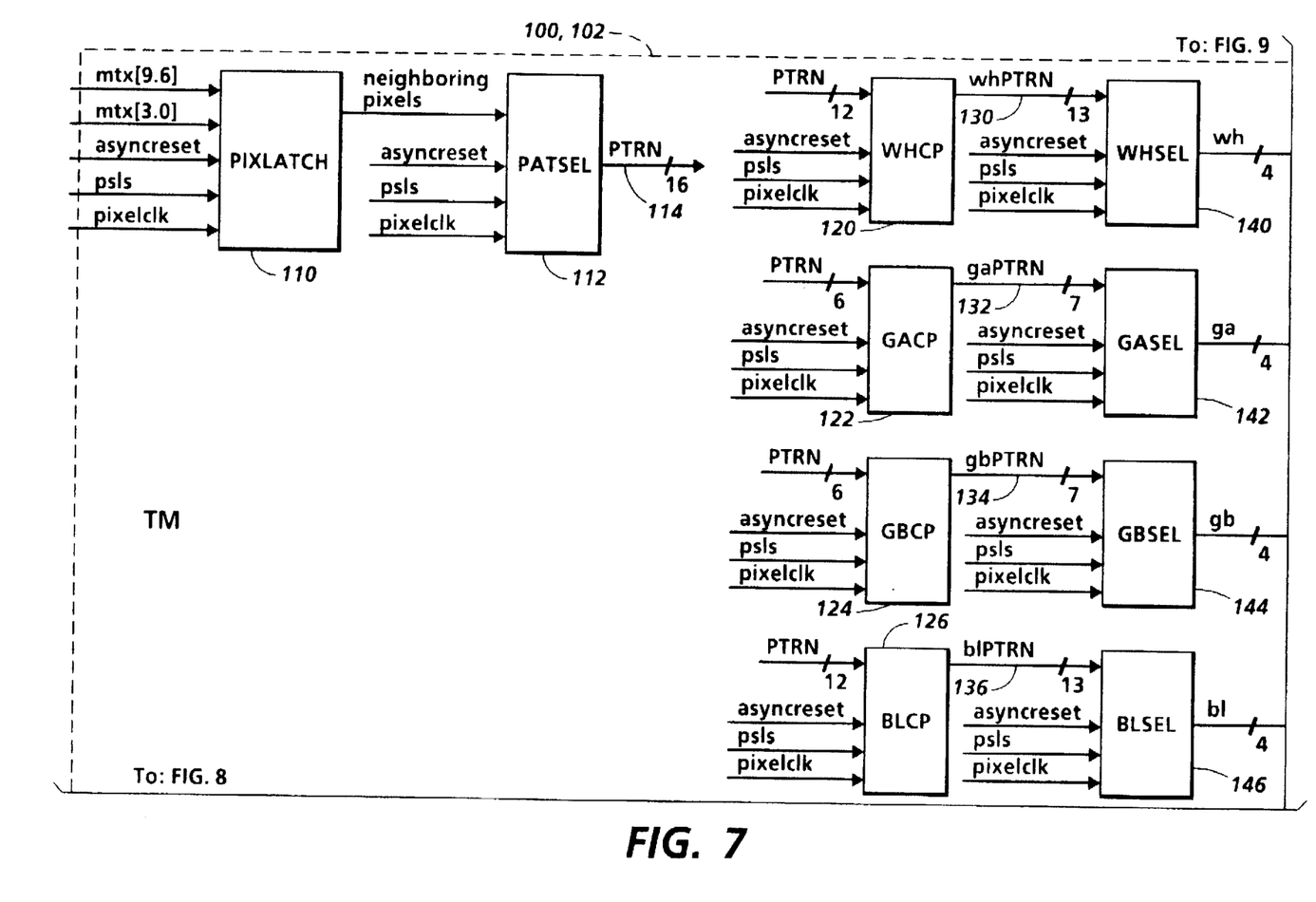
FIGS. 7–9 are a detailed block diagram of the logic circuits contained with a single channel of the template matching circuit of FIG. 6.

Referring now to FIGS. 6 and 7, in a preferred embodiment, the template matching operations are accomplished using two identical second level designs for the two channels. The two second level designs are illustrated as template matching (TM) blocks 100 and 102. During operation, image signals arranged in 3×3 matrix (context window 78 of FIG. 10) are selected from rasterized signals stored in memory. Two pixel matrices are formed simultaneously: one composed of the pixel data for channel A (preferably driving the upper beam of the ROS) and one composed of the pixel data for channel B (preferably driving the lower beam of the ROS). The image signal matrix for channel A is sent along bus mtxa[9:0] to TM block 100. The image signal matrix for channel B is sent along the bus mtxb[9:0] to TM block 102. Also specific to channels A and B are the signals pslsa and pslsb, respectively. Signals pslsa and pslsb are active high image enable signals that serve as active low synchronous resets to the respective TM circuits 100 and 102, respectively. Another active low reset to each TM block, asyncreset, is an asynchronous reset that occurs on a power-up condition to initialize the hardware blocks. The last input to the TM blocks is the pixel clock signal, pc.

Figure 8:
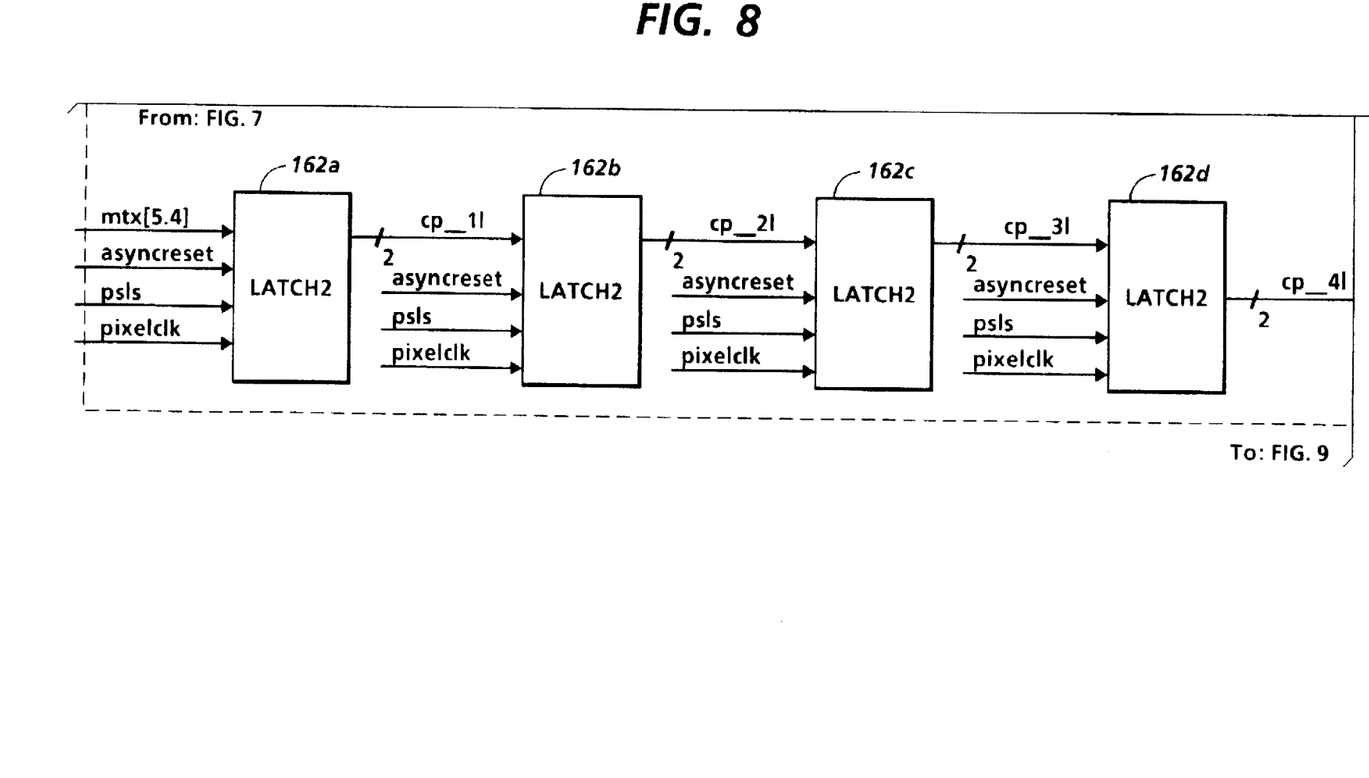
Figure 9:
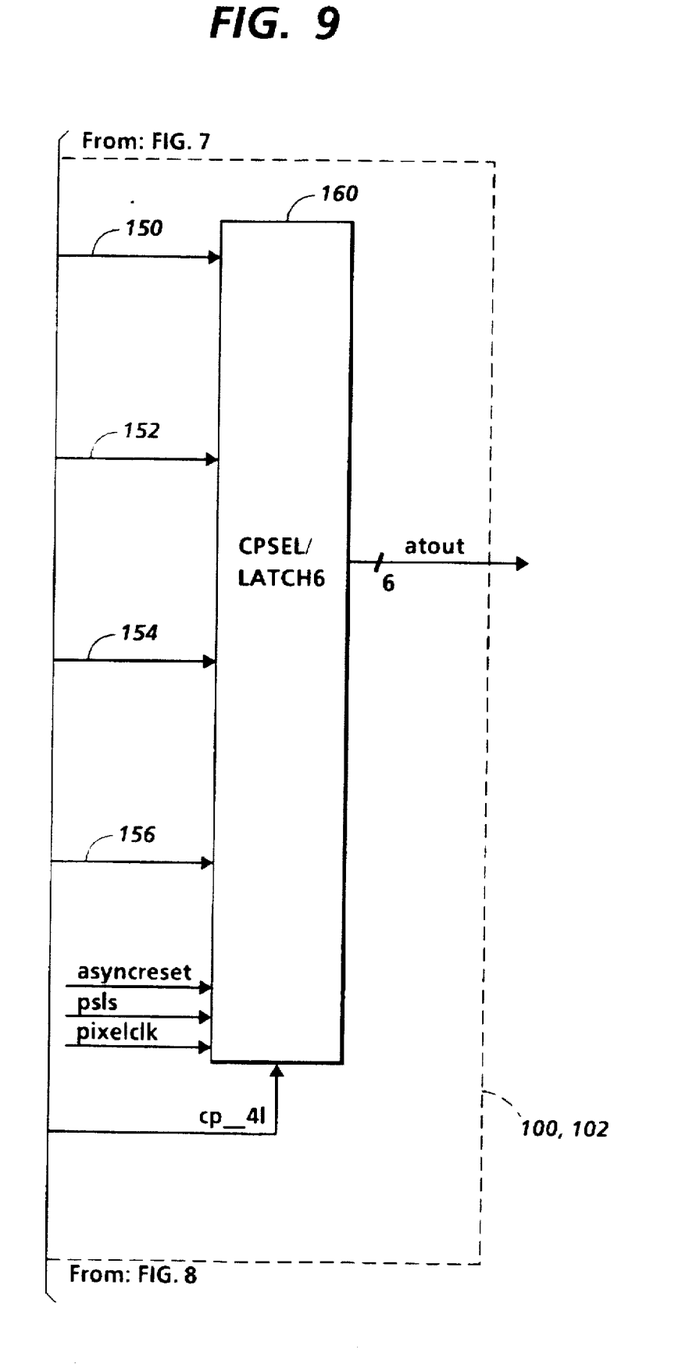

The template matching design hierarchy consists of three levels, the lowest level being represented in FIGS. 7–9. The synchronous and asynchronous resets of TM blocks 100 and 102 are delivered to each of the lower level blocks, as is the pixel clock. Each TM block latches data on the rising edge of the pixel clock. Synchronous resets also occur on the rising edge of the clock. The PIXLATCH block 110 of FIG. 2 latches in the 8 bits (upper or lower depending upon the channel) that define the neighboring pixels of the 3×3 context window and passes the four image signals corresponding to adjacent pixel positions ($P_1, P_2, P_4$ and $P_5$) to the PATSEL block 112, where pattern selection takes place. The pattern formed by the image signals for the four neighboring pixels is compared to each template in a set of sixteen predetermined templates in search of a match. If the third template in the set is a match, for instance, then the corresponding bit of the 16-bit PTRN bus 114 is set to a logical '1'. More than one template may be a match, so more than one bit of the PTRN bus may be a logic high at one time. Moreover, if either of the resets are active, then all 16 bits of PTRN bus become logical '0'.

Figure 11:
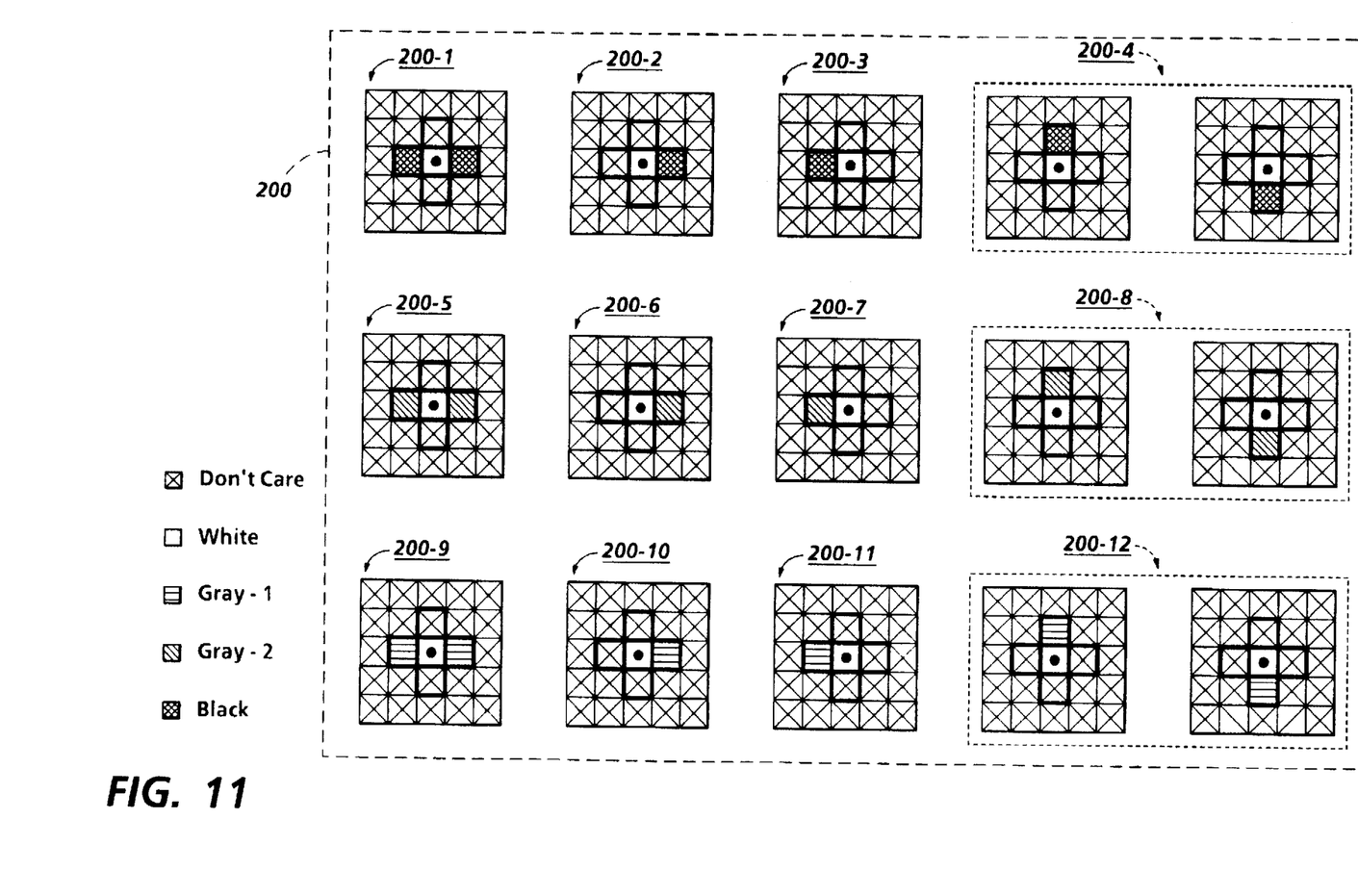
FIGS. 11-13 are illustrations of templates for four groups of templates as implemented by the logic circuits of FIGS. 7-9.

In a preferred embodiment, represented by FIG. 11, there are essentially twelve of sixteen templates of concern when the target pixel ($P_3$) is white (00/b). Thus, only twelve corresponding lines (bits) of the PTRN bus are passed to the WHCP block 120, where priority. selection takes place. The PTRN bits, forming a 12-bit output vector, are looked at in order of priority until one is found to be a logical '1'. When a logical '1' is found a corresponding bit of the output WHPTRN bus 130 is set at a logic high and other bits of the output vector are reset to a logic low. For example, if the first PTRN line to be checked is at '1' then the first bit (LSB) on the WHPTRN bus 130 becomes "1" and the rest of the WHPTRN bits become '0'. As illustrated in FIG. 11, three templates, 200-4, 200-8 and 200-12 are preferably designed to treat cases where a black, gray-1 or gray-2 pixel is present at adjacent positions above or below the target pixel. Thus, the logic circuitry necessary to test for the above-below cases is minimized. Although the input PTRN vector is twelve bits wide, the output WHPTRN vector is thirteen bits wide. The additional bit is necessary to include the default "no match" case, a condition that arises when no templates are matched. In a preferred embodiment, when the PTRN bits are all '0', indicating that no template match has occurred, then only the 13th bit on the WHPTRN bus becomes '1'. In addition, if either reset is active, then all 13 bits of the WHPTRN vector become logical '0'.

Figure 12:
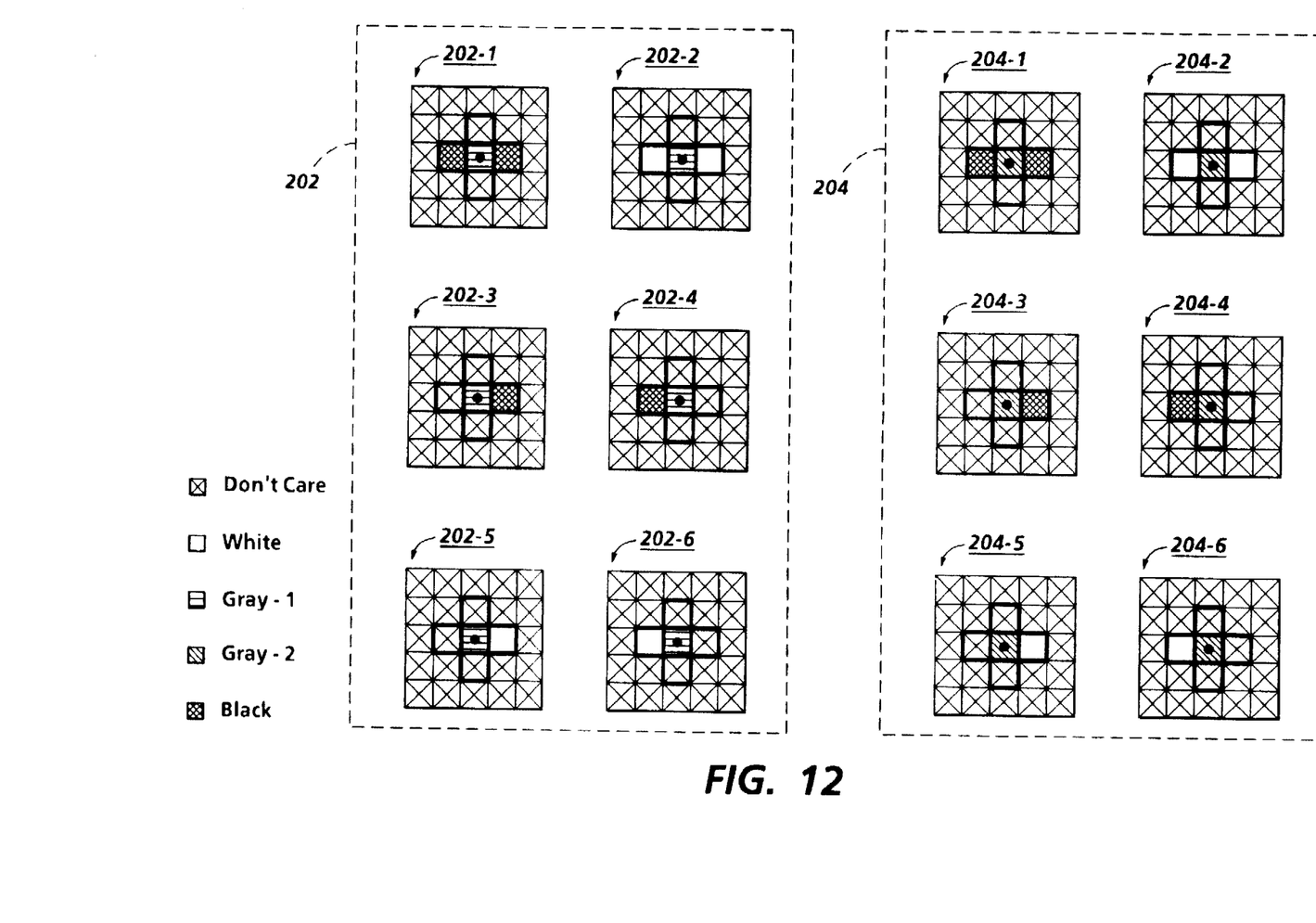
Figure 13:
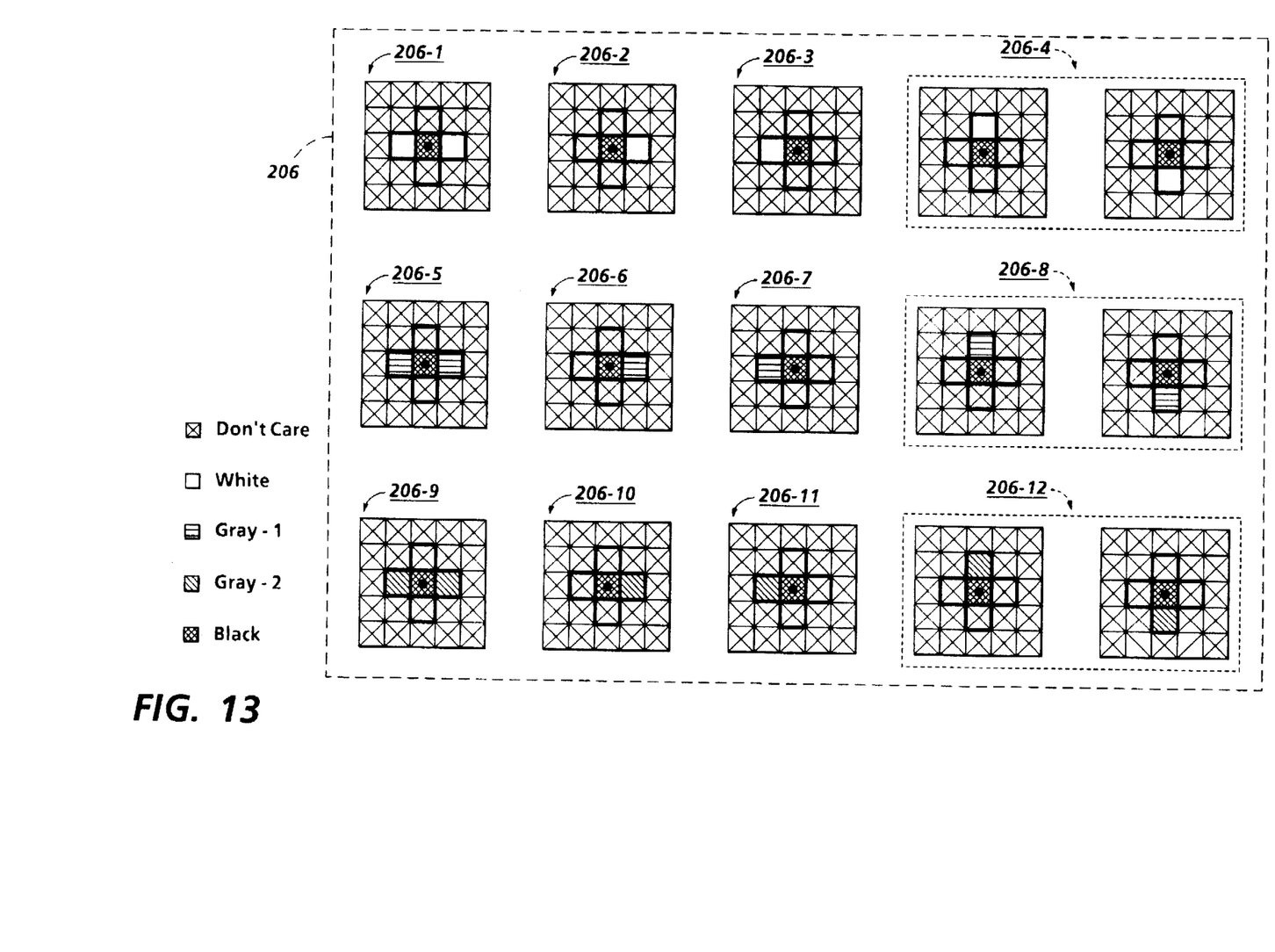

Similar to WHCP block 120 are the GACP block 122, GBCP block 124 and BLCP block 126. The GACP block 122 performs priority selection for six templates of interest when the center pixel is one of two possible gray levels (gray-1—01/b). GACP 122 outputs signals on a seven bit wide GAPTRN bus 132, reflecting the six templates of interest 202 plus the no-match case as illustrated in FIG. 12. The GBCP block 124 performs the priority selection for the six templates of interest (FIG. 12) when the center pixel is the second level of gray (gray-2=10/b). Like GACP 122, GBCP 124 outputs on a seven bit wide GBPTRN bus. Lastly, the BLCP block 126 performs priority selection for the twelve templates of interest when center pixel $P_3$ is black (11/b). Like WHCP block 120 BLCP block 126 outputs signals on a thirteen bit wide BLPTRN bus reflecting the combinatorial logic used to implement templates 206 in FIG. 13, and in particular the combinations in 206-4, 206-8 and 206-12 in the manner previously described with respect to FIG. 11.

Referring again to FIGS. 11–13, the templates implemented in each of the various blocks 120, 122, 124 and 126 are respectively represented in FIGS. 11, 12 and 13. Generally, these templates represent edge transitions and edge transition characteristics that are to be identified within the image. In addition, the templates in any particular group (white (200), gray-1 (202), gray-2 (204) or black (206)) are arranged and numbered in order of their respective priorities. For example, in the gray-1 template group illustrated in FIG. 12, template 202-1 (having black pixels on either side of the target pixel in a fast scan direction) has the highest priority of all templates. Accordingly, that template will be checked first for a match because a gray pixel located between two adjacent black or two adjacent white pixels is a "dangling" pixel that should be positioned so as to be center justified between neighboring pixels.

Referring again to FIG. 7, from the WHCP block 120 the 13-bit WHPTRN vector (from bus 130) gets transferred to the WHSEL block 140 where the selected template match is encoded to produce a 4-bit wh code, output on bus lines 150. An active reset will cause the bits of the output WH vector to be logic low. The GASEL block 142, GBSEL block 144 and BLSEL block 146 all perform similar encoding procedures for their selected template matches and likewise output a 4-bit code. The outputs of the latter blocks are ga, gb, and bl, respectively. Subsequently, the wh, ga, gb and bl codes are received by the CPSEL block 160 which performs a multiplexing (MUX) operation. The two bits of the target pixel (denoted as cp_4l in FIGS. 8 and 9) serve as the select bits for the CPSEL mux. As depicted along the bottom of FIG. 7 the target pixel bits are passed through a series of latches 162a, 162b, 162c and 162d prior to being passed to the CPSEL block 160 to ensure that the target pixel arrives at the MUX in sync with the wh, ga, gb and bl codes. Whether the target pixel is white, gray-1, gray-2 or black determines which of the four codes is selected. Furthermore, the two target pixel bits (cp_4l) become concatenated with the selected 4-bit code to form a 6-bit output that defines an address within LUT 86 (FIG. 4) which is external to the template matching block 84. For example, if the target pixel is gray-2 (10/b) and the gb code is 0011/b, then the output of CPSEL block 160 becomes 100011/b. Consequently, the LUT address 23/h will be accessed. Preferably, the output vector of CPSEL block 160 passes through a latch (not shown) before it actually leaves the TM blocks 100 or 102 of template matching block 84 and is written to the LUT 86.

Referring again to FIG. 4, LUT 86 is preferably comprised of a SRAM having a plurality of contiguous memory locations therein (e.g., 64 locations; 16 for each possible target pixel), each memory location suitable for storing an 8-bit digital value therein. The 8-bit values stored in the LUT for each channel of the dual-function circuit describes the width and position of a pixel to be printed (exposed). From the LUT, the 8-bit output is delivered to a pulse-width, position-modulated (PWPM) device (not shown) associated with ROS 88 for printing. In one embodiment, the two least significant bits of the 8-bit LUT output define the position of the pixel pulse (left, right or center justified) within a pixel period. The remaining six bits define the width of the pulse, so that 26 possible widths are available. It will be further appreciated by those skilled in the art that more or fewer bits may be employed (stored in LUT 86 and passed to ROS 88) for the PWPM control.

Once passed to the PWPM device, the 8-bit LUT output is processed to produce a pulse that, in turn, results in a lighter or darker output pixel. LUT 86 is preferably a programmable device, capable of having the contents stored therein downloaded to the LUT in response to a user input and/or system controller command. In particular, the data is downloaded in response to a selection of the appearance tuning level desired in the printed output. Different downloadable tables consisting of values representing position/width data for the PWPM are predetermined for each image processing mode: augmented compact dot growth (ACDG) for nominal density images; and appearance tuning (AT), which incorporates augmented compact dot growth along with lightening/darkening capability. Hence, a unique table of data preferably exists for at least the ACDG mode and one of seven lightness/darkness levels for the AT mode. Moreover, the tables are available for the various resolutions at which the printing system is designed to print (e.g., 1200 spi and 1800 spi resolution reconstruction).

As an example of the operation of LUT 86, the image information depicted in the image segment shown in FIG. 5 is noted. The image has a white target pixel ($P_3$) surrounded by white pixels, except on the immediate left ($P_2$) where a gray-2 (10/b) pixel is located. At 1800 spi, the gray-2 pixel is a 66.7% pixel that when dilated by 70% becomes a completely black pixel and the white target pixel (center) will be dilated by 36.7%. When processed in accordance with the present invention, the target pixel will be left justified to look like an extension of the now completely black pixel to the immediate left. Such a pixel would have an output of 01011101/b (width of 23/64 (36.7%) and left justified). In particular, the position of the pulse is determined as follows:

| $A_1/B_1$ | $A_0/B_0$ | |
|---|---|---|
| 0 | 0 | dual edge modulation (center) |
| 0 | 1 | trailing edge modulation (left) |
| 1 | 0 | dual edge modulation (center) |
| 1 | 1 | leading edge modulation (right) |

In recapitulation, the present invention is a dual-function apparatus for tuning the appearance and/or controlling dot growth of bitmap images rendered on a printing system. The invention operates to recognize those pixels with a bitmap image that are appropriate for alteration and, in response to downloadable output values, adjusts the identified pixels so as to ensure a desired output.

It is, therefore, apparent that there has been provided, in accordance with the present invention, an apparatus for altering the appearance of a bitmap image so as to enable the control of image density characteristics for documents printed thereon. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A printing system for processing a bitmap image consisting of a plurality of input image signals at a first resolution representing a bitmap image, comprising:

an encoder for encoding the input image signals at the first resolution so that the bitmap image is represented by a plurality of image signals at a second resolution lower than the first resolution, each of the second resolution signals having multiple but fewer bits than each of the first resolution signals so that a number of bits in the plurality of input image signals is discarded as a result of the encoding;

memory for storing the image signals at the second resolution;

a dual-function circuit for reconstructing the stored encoded bit stream so as to decode the second resolution image signals while appearance tuning the second resolution image signals and thereby producing a pulse-width position-modulated output signal, wherein said dual-function circuit comprises:

a template matching logic circuit for comparing the stored image signals of a plurality of pixel positions surrounding a target pixel position with a plurality of templates, said template matching circuit outputting signals indicating matches therebetween; and a programmable look-up table for generating the pulse-width position-modulated output signal in response to the signals output by the template matching circuit; and an output engine for outputting an image representation in response to the pulse-width position-modulated output signals generated by said dual function circuit, wherein the appearance tuning operation completed by the dual-function circuit includes controlling an exposure period of a pixel output in response to the pulse-width position-modulated output signals in conjunction with a repositioning of the pixel relative to at least one neighboring pixels.

2. The printing system of claim 1, wherein the stored image signals are concurrently compared with a plurality of templates.

3. The printing system of claim 1, wherein said programmable look-up table is responsive to the image signals of the target pixel position.

4. The printing system of claim 1 wherein said programmable look-up table comprises a plurality of memory locations located at a set of contiguous addresses, where values stored within the memory locations may be downloaded.

5. The printing system of claim 4 wherein the plurality of memory locations includes a set of memory locations, corresponding to the number of possible templates compared by the template matching logic circuit, for each of a plurality of possible image signal states for said target pixel position.

6. The printing system of claim 1 wherein said dual-function circuit includes a pair of parallel channels therein for processing the image signals at the second resolution.

7. The printing system of claim 6 wherein said dual-function circuit is implemented within an application specific integrated circuit.

8. An image processing apparatus for processing a bitmap image consisting of a plurality of multi-bit input image signals representing the bitmap image, comprising:

context memory for storing a portion of the image signals;

an application specific template matching circuit for comparing the stored image signals with a plurality of templates, said template matching circuit outputting a plurality of signals, each of the plurality of signals indicating a match between the stored image signals and a template, said template matching circuit including a latch for latching image signals that define neighboring pixels within a context window centered about a target pixel, said latch outputting at least four image signals corresponding to pixel positions adjacent the target pixel, pattern selection logic for comparing the image signals corresponding to pixel positions adjacent the target pixel to each of the plurality of templates, said pattern selection logic producing the plurality of signals indicating each match therebetween, a plurality of prioritization logic circuits, one for each of the possible image signal states of the target pixel, where a signal having highest priority is selected from the match sifthals produced by said pattern selection logic, a plurality of encoding circuits for encoding the signal having highest priority, each encoding circuit producing a multiple bit code, and a multiplexer, responsive to the image signal of the target pixel, for selecting the multiple bit code to be written to said programmable look-up table; and a programmable look-up table for generating a pixel output signal in response to the plurality of signals input thereto by the template matching circuit, the pixel output signal representing the characteristics of the pixel.

9. A printing system for processing a bitmap image consisting of a plurality of gray input image signals at a first resolution representing a bitmap image at a resolution greater than the first resolution, comprising:

memory for storing the gray image signals at the first resolution;

pattern matching logic circuitry including a template matching circuit for identifying, within the gray image signals at the first resolution, target pixels requiring modification prior to output as binary pixels at a second resolution greater than the first resolution, said pattern matching logic circuitry producing a signal whenever a target pixel requiring modification is identified, wherein said template matching circuit compares the gray image signals for the target pixel and a plurality of neighboring pixels to a plurality of predefined template patterns to determine matches therewith; and upon identifying such matches produces a multi-bit signal indicative of those of the plurality of predefined template patterns that are matched; and a programmable device, responsive to the signal generated by the pattern matching logic circuitry and the target pixel image signal, for producing an output signal for driving the printing system, said programmable device being programmed in accordance with a set of preselected appearance tuning and augmented compact dot growth requirements.

10. The apparatus of claim 9, wherein the plurality of neighboring pixels comprise four pixels in positions adjacent to the target pixel position within the bitmap image.

11. The apparatus of claim 9, wherein said printing system further includes a raster output scanning exposure system responsive to a pulse-width, position-modulated output signal generated by said programmable device.

12. The apparatus of claim 11, wherein said pulse-width, position-modulated output signal includes:

a first signal portion representing the position of an exposure pulse within a pixel period; and a second signal portion representing the duration of the exposure pulse.

13. The apparatus of claim 11, wherein said programmable device is a look-up table organized as a plurality of contiguous memory locations.

14. The apparatus of claim 9, wherein said programmable device is selectively reprogrammed in accordance with a new set of preselected appearance tuning and augmented compact dot growth requirements.

* * * * *